United States Patent
Raj et al.

(10) Patent No.: US 10,432,416 B2
(45) Date of Patent: Oct. 1, 2019

(54) METHOD FOR PERFORMING EVOLVED MULTIMEDIA BROADCAST AND MULTICAST SERVICE (EMBMS) COUNTING IN WIRELESS SYSTEMS

(71) Applicant: Samsung Electronics Co., Ltd., Gyeonggi-do (KR)

(72) Inventors: Rohan Raj, Bangalore (IN); Vinay Kumar Shrivastava, Bangalore (IN)

(73) Assignee: Samsung Electronics Co., Ltd (KR)

( * ) Notice: Subject to any disclaimer, the term of this patent is extended or adjusted under 35 U.S.C. 154(b) by 201 days.

(21) Appl. No.: 14/824,773

(22) Filed: Aug. 12, 2015

(65) Prior Publication Data
US 2016/0050077 A1    Feb. 18, 2016

(30) Foreign Application Priority Data

Aug. 12, 2014  (IN) ............................ 3958/CHE/2014
Aug. 11, 2015  (IN) ............................ 3958/CHE/2014

(51) Int. Cl.
*H04L 12/18*       (2006.01)
*H04W 28/06*       (2009.01)
(Continued)

(52) U.S. Cl.
CPC ............. *H04L 12/189* (2013.01); *H04W 4/06* (2013.01); *H04W 28/06* (2013.01); *H04W 72/005* (2013.01)

(58) Field of Classification Search
CPC ........ H04W 72/00; H04W 36/00; H04W 4/00
(Continued)

(56) References Cited

U.S. PATENT DOCUMENTS

2004/0229626 A1   11/2004  Yi et al.
2005/0041681 A1*   2/2005  Lee ................... H04W 72/1289
                                                    370/437
(Continued)

FOREIGN PATENT DOCUMENTS

CN        1842037      10/2006
CN      101668249       3/2010
(Continued)

OTHER PUBLICATIONS

International Search Report dated Nov. 25, 2015 issued in counterpart application No. PCT/KR2015/008450, 13 pages.
(Continued)

*Primary Examiner* — Alpus Hsu
*Assistant Examiner* — Camquyen Thai
(74) *Attorney, Agent, or Firm* — The Farrell Law Firm, P.C.

(57) ABSTRACT

A method for performing evolved multimedia broadcast and multicast service (eMBMS) counting efficiently in wireless systems is provided. The method includes receiving by a radio link control (RLC) layer of a User Equipment (UE), a Multicast Control Channel (MCCH) packet containing an MBMS counting request from a network. The RLC layer then transfers the MCCH packet to a Radio Resource Control (RRC) layer of the UE. The RRC layer processes the MBMS counting request and generating an MBMS counting response by and transmits an indication for successful reception of the MBMS counting request to the RLC layer. The RLC layer verifies if a subsequent MCCH modification boundary indication is received in a selected MCCH modification period and discards one or more subsequent MCCH packets received in a selected MCCH modification period if the MCCH modification boundary indication is not received from a physical layer.

6 Claims, 3 Drawing Sheets

(51) Int. Cl.
*H04W 4/06* (2009.01)
*H04W 72/00* (2009.01)

(58) Field of Classification Search
USPC .............................. 370/328, 432, 437, 396.6
See application file for complete search history.

(56) References Cited

U.S. PATENT DOCUMENTS

| | | | |
|---|---|---|---|
| 2006/0067361 A1 | 3/2006 | Lee et al. | |
| 2007/0177608 A1* | 8/2007 | Ding | H04L 69/22 370/395.6 |
| 2008/0318566 A1* | 12/2008 | Chun | H04W 48/12 455/422.1 |
| 2009/0201854 A1* | 8/2009 | Roger | H04W 72/005 370/328 |
| 2010/0120452 A1* | 5/2010 | Somasundaram | H04W 74/008 455/458 |
| 2011/0019604 A1 | 1/2011 | Chun et al. | |
| 2011/0117912 A1* | 5/2011 | Mahajan | H04W 48/12 455/434 |
| 2012/0009947 A1 | 1/2012 | Lee et al. | |
| 2012/0069728 A1* | 3/2012 | Jung | H04W 76/18 370/216 |
| 2012/0202493 A1* | 8/2012 | Wang | H04W 60/00 455/435.1 |
| 2013/0003640 A1 | 1/2013 | Yang et al. | |
| 2013/0176923 A1 | 7/2013 | Liu et al. | |
| 2013/0215761 A1* | 8/2013 | Xu | H04W 24/08 370/241 |
| 2013/0215817 A1* | 8/2013 | Lu | H04L 12/1868 370/312 |
| 2014/0171138 A1* | 6/2014 | Wix | H04L 47/323 455/509 |
| 2014/0198685 A1* | 7/2014 | Xu | H04W 24/02 370/254 |
| 2014/0307616 A1 | 10/2014 | Hwang et al. | |
| 2014/0334353 A1* | 11/2014 | Wei | H04W 72/1263 370/280 |
| 2016/0278042 A1* | 9/2016 | Kim | H04W 4/06 |

FOREIGN PATENT DOCUMENTS

| | | |
|---|---|---|
| CN | 103828402 | 5/2014 |
| JP | 2009-535862 | 10/2009 |
| JP | 2013-543679 | 12/2013 |
| KR | 1020100071665 | 6/2010 |
| KR | 10-1054957 | 8/2011 |
| WO | WO 2013/044971 | 4/2013 |

OTHER PUBLICATIONS

3GPP TSG-RAN2 Meeting #87, Dresden, Germany, Aug. 18-22, 2014, R2-143896, Clarification on MBMSCountingResponse.
3GPP TSG-RAN2 Meeting #87, Dresden, Germany, Aug. 18-22, 2014, R2-143897, Clarification on MBMSCounting Response.
Chinese Office Action dated Feb. 3, 2019 issued in counterpart application No. 201580043648.X, 26 pages.
Japanese Office Action dated Feb. 19, 2019 issued in counterpart application No. 2017-504382, 6 pages.

* cited by examiner

METHOD FOR PERFORMING EVOLVED MULTIMEDIA BROADCAST AND MULTICAST SERVICE (EMBMS) COUNTING IN WIRELESS SYSTEMS

PRIORITY

This application claims priority under 35 U.S.C. § 119(a) to an Indian Provisional Patent Application filed in the Indian Intellectual Property Office on Aug. 12, 2014 and assigned Serial No. 3958/CHE/2014 and an Indian Complete Patent Application filed in the Indian Intellectual Property Office on Aug. 11, 2015 and assigned Serial No. 3958/CHE/2014, the entire disclosures of both of which are incorporated herein by reference.

BACKGROUND OF THE INVENTION

1. Field of the Invention

The present invention generally relates to wireless communication systems and particularly relates to a method for performing evolved multimedia broadcast and multicast service (eMBMS) counting in wireless systems.

2. Description of the Related Art

In order to effectively use mobile network resources, the 3rd Generation Partnership Project (3GPP) defines Multimedia Broadcast and Multicast Service (MBMS). In LTE, it is called evolved Multimedia Broadcast and Multicast Service (eMBMS). The terms MBMS and eMBMS are used interchangeably in the document. The MBMS service relates to transmitting data from a data source to a plurality of target devices, which involves the sharing of network (comprising a core network and an access network) resources and improves the utilization rate of the network resources (especially air interface resources). The eMBMS service defined by the 3GPP not only provides the multicast and broadcast of message class with pure text and low rate but also provides the broadcast and multicast of high speed multimedia services. The MBMS service provides various rich video, audio and multimedia services, which undoubtedly conforms to the development trend of the future mobile data and provides a better service prospect for the development of the 3rd Generation (3G) mobile communication.

Currently, the evolved MBMS service is introduced in Long Term Evolution (LTE) system for broadcasting infotainment services over coverage area utilizing Multicast-Broadcast Single-Frequency Network (MBSFN) technique to a large number of User Equipments (UEs). The MBSFN technology requires each cell in the MBSFN area to send the same data content on the same time frequency resources, which requires carrying out uniform scheduling and planning on each cell. The eMBMS counting procedure is used to count the number of UEs in connected mode which are receiving eMBMS service(s) and/or interested to receive eMBMS services. It provides network with valuable information about users and services for better provisioning, planning and operation of eMBMS services. The information can also be used as TRP ratings for services. For this purpose, messages are defined for this information exchange between UE and network termed as Counting Procedure as illustrated in FIG. 1. As shown in FIG. 1, the UE receives an MBMSCountingRequest message from a network such as an Evolved Universal Mobile Telecommunications System Terrestrial Radio Access Network (EUTRAN). As per the 3GPP Specification, the UE treats the MBMSCountingRequest messages received in each modification period independently. In response to the request message, the UE transmits a MBMS counting response to the E-UTRAN.

In the unlikely case, the E-UTRAN repeats an MBMSCountingRequest (i.e. including the same services) in a subsequent modification period, and the UE also responds again. The request from the E-UTRAN network are shared via multicast control channel (MCCH) and responses from the UE are transmitted on unicast channel. A potential issue is seen that during same modification period i.e. at repeated occasions of MCCH, UE cannot avoid responding to counting requests. This is because MCCH packet data units (PDUs) can be multiplexed with Multicast Traffic Channel (MTCH) or MSI (MCH Scheduling Information) PDUs during active services reception, UE is likely to receive counting request again at repetition occasions during modification period as shown in FIG. 2. When this happens RRC cannot distinguish if counting request is again received within same modification period and how it has to be handled as RRC is not aware about modification boundaries. In worst case, the UE responds for every such occasion which is undesired (unintended behavior, un-necessary messages, additional power consumption etc.). The problem will be faced by each of the UEs deploying MBMS operation. Also, network receives multiple responses from the UEs in its coverage and it could lead to incorrect estimation of the number of the UEs interested in different set of services and overall, counting mechanism itself will be hampered.

In view of the foregoing, there is a need for a method for performing evolved multimedia broadcast and multicast service (eMBMS) counting procedure efficiently in wireless systems.

The foregoing examples of the related art and limitations related therewith are intended to be illustrative and not exclusive. Other limitations of the related art will become apparent upon a reading of the specification and a study of the drawings.

SUMMARY OF THE INVENTION

The various embodiments herein describe a method for performing Evolved Multimedia Broadcast and Multicast Service (eMBMS) counting efficiently in wireless systems. In one embodiment, the method comprises of receiving, by a Radio Link Control (RLC) layer of a User Equipment (UE), a Multicast Control Channel (MCCH) packet containing an MBMS counting request from a network, transferring the MCCH packet to a Radio Resource Control (RRC) layer of the UE, generating, by the RRC layer, an MBMS counting response by processing the MBMS counting request, receiving, by a Radio Link Control (RLC) layer, an indication for successful reception of the MBMS counting request from the RRC layer, verifying if a subsequent MCCH modification boundary indication is received in a selected MCCH modification period, and discarding one or more subsequent MCCH packets received in a selected MCCH modification period if the MCCH modification boundary indication is not received from a physical layer.

According to an embodiment of the present invention, the method allows the UE to provide at most one MBMS counting response message to multiple transmission attempts of an MBMSCountingRequest messages in a selected MCCH modification period.

According to an embodiment of the present invention, the duplicate transmissions of MCCH packets in the selected MCCH modification period are discarded through a cross-layer communication between the RLC layer and the RRC layer.

According to an embodiment of the present invention, the method herein uses at least one of a global variable and a flag to indicate the status of the MCCH packet reception and processing of the MCCH boundary indication.

According to an embodiment of the present invention, the RRC layer initiates a timer to account for a modification time period when the MCCH boundary indication is received.

Another embodiment of the present invention discloses a method of handling Multimedia Broadcast and Multicast Service (eMBMS) counting in a wireless communication system, wherein the method comprises of receiving, by a radio link control (RLC) layer of a User Equipment (UE), a Multicast Control Channel (MCCH) packet along with boundary indication from a physical layer, decoding the received MCCH packet containing an MBMS counting request, transferring the MBMS counting request message along with an MCCH boundary indication to a Radio Resource control (RRC) layer, transmitting, by the RRC layer, an MBMS counting response generated by processing the MBMS counting request, and discarding, by the RRC layer, one or more subsequent MCCH packets until a subsequent MCCH modification boundary indication is received from the RLC layer.

According to an embodiment of the present invention, the method allows the UE to provide at most one MBMS counting response message to multiple transmission attempts of an MBMSCountingRequest messages in a selected MCCH modification period.

According to the embodiments of the present invention, the MCCH packet being transferred between the UE and the network further comprises of an area configuration message.

The foregoing has outlined, in general, the various aspects of the invention and is to serve as an aid to better understanding the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

BRIEF DESCRIPTION OF THE DRAWINGS

The other objects, features and advantages will occur to those skilled in the art from the following description of the preferred embodiment and the accompanying drawings in which.

Although specific features of the present invention are shown in some drawings and not in others, this is done for convenience only as each feature may be combined with any or all of the other features in accordance with the present invention.

DETAILED DESCRIPTION OF THE INVENTION

The present invention provides a method of handling eMBMS counting in wireless communication systems. The method enables UE to handle the counting procedure, by discarding any repeated and undesired counting request (MCCH) messages by the layer 2. The MCCH modification boundary information is obtained by the RRC layer and this information is used for handling counting procedure. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Figure 1:
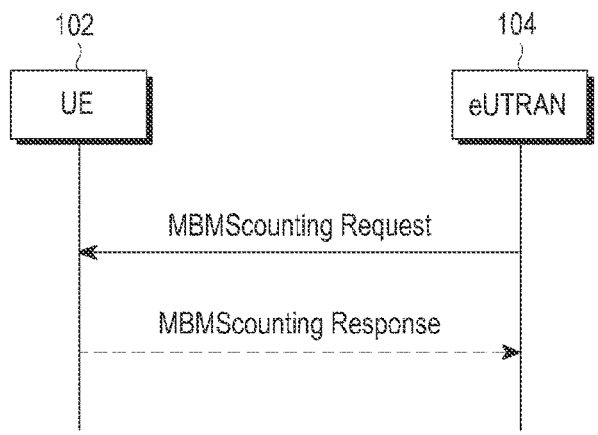
FIG. 1 is a flow diagram depicting the counting procedure of exchanging information between UE and network, according to related art.
Figure 2:
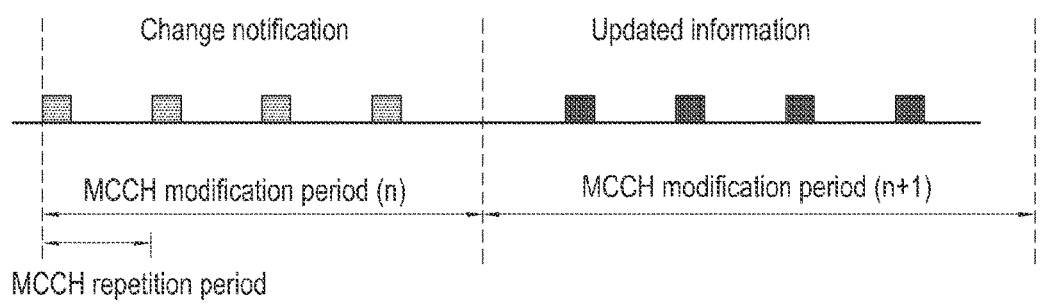
FIG. 2 is a timing diagram depicting the modification periods of MCCH during active services reception, according to related art.
Figure 3:
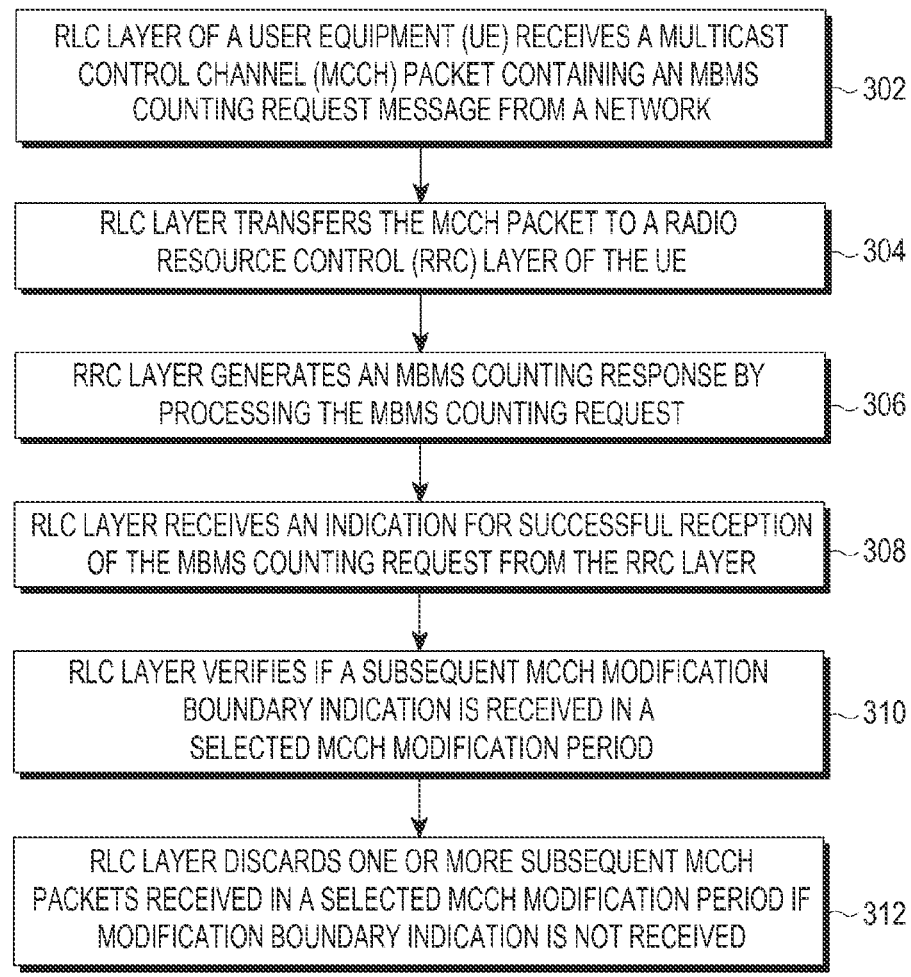
FIG. 3 is a flow chart illustrating a method of performing evolved multimedia broadcast and multicast service (eMBMS) counting in wireless communication systems, according to an embodiment of the present invention.

FIG. 3 is a flow chart diagram illustrating a method of performing evolved multimedia broadcast and multicast service (eMBMS) counting in wireless communication systems, according to an embodiment of the present invention. As shown in FIG. 3, at step 302, the Radio Link Layer (RLC) of the User Equipment (UE) receives a Multicast Control Channel (MCCH) packet containing an MBMS counting request is received from a network. At step 304, the MCCH packet from the RLC layer is processed and transferred to a Radio Resource Layer (RRC) of the UE. The RRC layer after obtaining the MCCH packet processes the MBMS counting request and generates an MBMS counting response at step 306. Further, the RRC layer sends an indication for successful reception of the MBMS counting request to the RLC layer at step 308. At step 310, the RLC layer checks if a subsequent MCCH modification boundary indication is received in a selected MCCH modification period. If MCCH modification boundary indication is not received, then the RLC layer rejects one or more subsequent MCCH packets received in the selected or a given MCCH modification period at step 312. In this embodiment, the UE provides only a single MBMS counting response to multiple transmission attempts of an MBMSCountingRequest messages in a selected MCCH modification period.

In another embodiment, the MCCH packet may consist of MBMS Area configuration message only or both MBMS Area configuration message and MBMS counting request message. Thereby UE is able to discard any duplicate transmission attempts of the said combination of messages in the same Modification period.

Figure 4:
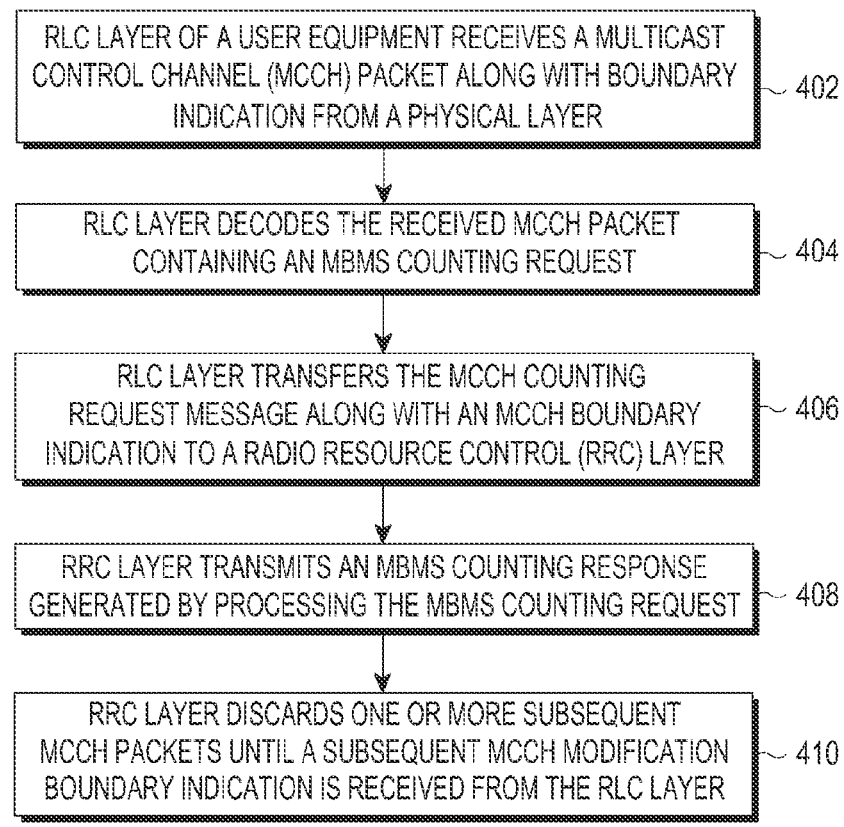
FIG. 4 is a flow chart illustrating a method of performing evolved multimedia broadcast and multicast service (eMBMS) counting in wireless communication systems, according to another embodiment of the present invention.

FIG. 4 is a flow chart diagram illustrating a method of performing evolved multimedia broadcast and multicast service (eMBMS) counting in wireless communication systems, according to another embodiment of the present invention. At step 402, the RLC layer of the UE receives a Multicast Control Channel (MCCH) Packet along with a boundary indication from a physical layer of the user equipment. At step 404, the received MCCH packet is decoded. The MCCH packet herein contains an MBMS counting request. The decoded packet containing MBMS counting request along with an MCCH boundary indication is processed and transferred to the RRC layer at step 406. Then, at step 408, the RRC layer generates the MBMS counting response by processing the MBMS counting request and transmits the MBMS counting response towards the network. At step 410, the RRC layer discards one or more one or more subsequent MCCH packets from the RLC layer, until a subsequent MCCH modification boundary indication is received. In this embodiment, the UE provides a single MBMS counting response message to multiple transmission attempts of an MBMSCountingRequest messages in a given MCCH modification period.

In another embodiment, the MCCH packet may consist of MBMS Area configuration message only or both MBMS Area configuration message and MBMS counting request message. Thereby UE is able to discard any duplicate transmission attempts of the said combination of messages in the same Modification period.

The embodiments of the present invention enables the UE to consider counting request messages received from the network independently, when the messages are received in different modifications periods. If the counting request messages are received in same modification period, the UE checks whether any MCCH boundary indication is received along with the counting request message. If the boundary indication is not received, then the UE discards all the counting request messages received in that modification period. Thus, the UE saves time and resources in preparing the counting response and reporting the counting response unnecessarily to other layers. Further the embodiments herein enables the UE to handle the duplication of MCCH packets received from network using the described methods.

In other embodiments, the said method of discarding duplicate MCCH transmissions in modification period is achieved in implementations through the use of cross-layer communication between RLC and RRC layer with usage of global variable(s), flag(s) to indicate the success or failure of MCCH packet reception and processing and/or modification boundary indication. In yet another embodiment, RRC layer employs a timer to account for modification period time and starts the timer when an indication of modification boundary is received from lower layer e.g. RLC or PHY layer. Any duplicate MCCH packet received before expiry of timer is discarded.

Though the embodiments are specifically mentioned with RRC and RLC layers. However it in true sense it is not limited by it. In general any higher layer (RRC etc) involved in processing of MCCH packet/MBMS counting message and any lower layer involved in decoding and parsing of MCCH packet (RLC, MAC, PHY etc) can be involved in the method for discard of duplicate transmission attempts in the same modification period.

In yet another embodiment, network entity carries out functionality of identifying and filtering any repeated MBMS counting response message from any of the UEs served by it and consider only one input for the UE. This filtering approach may include distinguishing messages with respect to the UE identity (also called UE identity) and comparing against their reception times with respect to modification boundaries.

Unless otherwise defined, all terms (including technical and scientific terms) used herein have the same meaning as commonly understood by one of ordinary skilled in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method of handling multimedia broadcast and multicast service (MBMS) counting in a wireless communication system, the method comprising:
   receiving, by a radio link control (RLC) layer of a user equipment (UE), a multicast control channel (MCCH) packet including an MBMS counting request from a network in an MCCH modification period;
   transferring the MCCH packet to a radio resource control (RRC) layer of the UE;
   generating, by the RRC layer, an MBMS counting response by processing the MBMS counting request;
   receiving, by the RLC layer, an indication for successful reception of the MBMS counting request from the RRC layer;
   verifying whether an MCCH modification boundary indication is received from a physical layer in the MCCH modification period after receiving the MCCH packet; and
   discarding one or more MCCH packets received in the MCCH modification period after receiving the MCCH packet and providing at most one MBMS counting response to multiple transmission attempts of the MBMS counting request in the MCCH medication period, if the MCCH modification boundary indication is not received in the MCCH modification period after receiving the MCCH packet,
   wherein the MCCH packet further includes an area configuration message, and
   wherein discarding the one or more MCCH packets in the MCCH modification period comprises cross-layer communicating between the RLC layer and the RRC layer.

2. The method of claim 1, wherein at least one of a global variable and a flag is used to indicate status of the MCCH packet reception and processing of the MCCH modification boundary indication.

3. The method of claim 1, further comprising initiating, by the RRC layer, a timer to account for the MCCH modification period when the MCCH modification boundary indication is received.

4. A method of handling multimedia broadcast and multicast service (MBMS) counting in a wireless communication system, the method comprising:

receiving, by a radio link control (RLC) layer of a user equipment (UE), a multicast control channel (MCCH) packet including an MBMS counting request and an MCCH modification boundary indication from a physical layer;

decoding the received MCCH packet;

transferring the MBMS counting request and the MCCH modification boundary indication to a radio resource control (RRC) layer;

transmitting, by the RRC layer, to a network, an MBMS counting response generated by processing the MBMS counting request; and discarding, by the RRC layer, one or more MCCH packets received after receiving the MCCH packet and providing at most one MBMS counting response to multiple transmission attempts of the MBMS counting request in a selected MCCH modification period, until a subsequent MCCH modification boundary indication is received from the RLC layer, wherein the MCCH packet further includes an area configuration message, and wherein discarding the one or more MCCH packets comprises cross-layer communicating between the RLC layer and the RRC layer.

5. The method of claim 4, wherein at least one of a global variable and flag is used to indicate status of the MCCH packet reception and processing of the MCCH modification boundary indication.

6. The method of claim 4, further comprising initiating, by the RRC layer, a timer to account for a selected MCCH modification period, when the MCCH modification boundary indication is received.

* * * * *